United States Patent
Duan et al.

(10) Patent No.: US 8,102,613 B2
(45) Date of Patent: Jan. 24, 2012

(54) SYSTEM, METHOD AND APPARATUS FOR DETERMINING TRACK PITCH IN A HARD DISK DRIVE TO SATISFY THE REQUIREMENTS OF BOTH OFF-TRACK CAPACITY AND ADJACENT TRACK ERASURE

(75) Inventors: Shanlin Duan, Fremont, CA (US); Zhen Jin, Fremont, CA (US); Jane Jie Zhang, San Jose, CA (US); Kezhao Zhang, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 126 days.

(21) Appl. No.: 12/567,262

(22) Filed: Sep. 25, 2009

(65) Prior Publication Data

US 2011/0075286 A1    Mar. 31, 2011

(51) Int. Cl.
G11B 27/36 (2006.01)

(52) U.S. Cl. .......... 360/31; 360/53; 360/60; 360/75; 360/77.02; 360/78.04

(58) Field of Classification Search .......... None
See application file for complete search history.

(56) References Cited

U.S. PATENT DOCUMENTS

| | | | |
|---|---|---|---|
| 5,600,500 A * | 2/1997 | Madsen et al. ............ 360/46 |
| 6,052,250 A * | 4/2000 | Golowka et al. ........ 360/77.08 |
| 6,445,521 B1 * | 9/2002 | Schaff et al. ............ 360/31 |
| 6,611,395 B1 | 8/2003 | Chainer et al. |
| 6,680,609 B1 | 1/2004 | Fang et al. |
| 6,879,460 B2 * | 4/2005 | Tomiyama et al. ...... 360/77.04 |
| 6,975,468 B1 | 12/2005 | Melrose et al. |
| 7,133,231 B2 | 11/2006 | Yun et al. |
| 7,170,700 B1 * | 1/2007 | Lin et al. ............... 360/31 |
| 7,227,708 B2 * | 6/2007 | Feng .................... 360/31 |
| 7,242,550 B2 | 7/2007 | Hara et al. |
| 7,706,096 B2 * | 4/2010 | Ito et al. ................ 360/75 |
| 2005/0052767 A1 * | 3/2005 | Miyata et al. ........... 360/31 |
| 2007/0074083 A1 | 3/2007 | Olds et al. |
| 2008/0062550 A1 * | 3/2008 | Lu ...................... 360/31 |
| 2008/0174905 A1 * | 7/2008 | Ueda ................... 360/77.04 |
| 2008/0266697 A1 | 10/2008 | Ohta et al. |

(Continued)

FOREIGN PATENT DOCUMENTS

JP    2000339601 A    12/2000

OTHER PUBLICATIONS

Zhen Jin et al., "Areal-Density Capability of a Magnetic Recording System Using a "747" Test Based Only on Data-Block Failure-Rate," IEEE Transactions on Magnetics, vol. 44, No. 11, Nov. 2008, pp. 3718-3721.

(Continued)

Primary Examiner — Dismery Mercedes (57) ABSTRACT

Track pitch in a hard disk drive is selected to satisfy the requirements of both off-track capacity (OTC) and adjacent track interference (ATI). The invention separately measures the track pitch requirements for OTC and ATI. The track pitch for the drive is set with the larger of the OTC and ATI track pitches. The OTC track pitch is measured with a 747 curve, and the ATI track pitch is measured by the positions of adjacent tracks at which the on-track error rate is not worse than a given value after the targeted number of adjacent track writes in the ATI requirement.

16 Claims, 8 Drawing Sheets

U.S. PATENT DOCUMENTS

2009/0073594 A1    3/2009  Ito et al.
2011/0069414 A1*   3/2011  Urakami et al. .............. 360/264

OTHER PUBLICATIONS

Zhihao (George) Li et al., "Adjacent Track Erasure Analysis and Modeling at High Track Density," IEEE Transactions on Magnetics, vol. 39, No. 5, Sep. 2003, pp. 2627-2629.

Wen Jiang et al., "Adjacent-Track Interference in Dual-Layer Perpendicular Recording," IEEE Transactions on Magnetics, vol. 39, No. 4, Jul. 2003, pp. 1891-1896.

R. S. Beach et al., "An Off-Track Capability Model Including Noise," IEEE Transactions on Magnetics, vol. 34, No. 4, Jul. 1998, pp. 1961-1963.

J. K. Lee et al., "A Track Density Model for Magnetoresistive Heads Considering Erase Bands," IEEE Transactions on Magnetics, vol. 26, No. 5, Sep. 1990, pp. 2475-2477.

Roy A. Jensen et al., "Demonstration of 500 Megabits per Square Inch with Digital Magnetic Recording," IEEE Transactions on Magnetics, vol. 26, No. 5, Sep. 1990, pp. 2169-2171.

Zhihao Li et al., "Adjacent track encroachment analysis at high track density," Journal of Applied Physics, vol. 93, No. 10, May 15, 2003, pp. 6456-6458.

M. Sharrock et al., "Kinetic Effects in Coercivity Measurements," IEEE Trans, Magn., MAG-17, 3020 (1981).

* cited by examiner

SYSTEM, METHOD AND APPARATUS FOR DETERMINING TRACK PITCH IN A HARD DISK DRIVE TO SATISFY THE REQUIREMENTS OF BOTH OFF-TRACK CAPACITY AND ADJACENT TRACK ERASURE

BACKGROUND OF THE INVENTION

1. Technical Field

The present invention relates in general to hard disk drives and, in particular, to an improved system, method and apparatus for determining the track pitch in a hard disk drive to satisfy the requirements of both off-track capacity and adjacent track erasure.

2. Description of the Related Art

Hard disk drives provide data storage for data processing systems in computers and servers. Disk drives are also becoming increasingly pervasive in media players, digital recorders, and other personal devices. Advances in disk drive technology have made it possible for a user to store an immense amount of digital information on increasingly smaller areas, and to selectively retrieve and alter portions of such information almost instantaneously. Particularly, recent developments have simplified disk drive manufacturing while yielding increased track densities, thus promoting increased data storage capabilities at reduced costs.

Hard disk drives rotate high precision media, such as an aluminum or glass disk coated on both sides with thin films, to store information in the form of magnetic patterns. Electromagnetic read/write heads suspended or floating only fractions of micro inches above the disk are used to either record information onto the thin film media, or read information from it.

A read/write head may write information to the disk by creating an electromagnetic field to orient a cluster of magnetic grains, known as a bit, in one direction or the other. In longitudinal magnetic recording media applications, a magnetic recording layer has a magnetic c-axis or easy axis parallel to the disk plane. As the disk drive industry is transitioning to perpendicular recording technology, adjustments are being made to adapt the disk media so that the magnetic easy axis of the cobalt alloy recording layers grow perpendicular to the disk plane. Hexagonal close packed cobalt alloys are typically used as a magnetic recording layer for perpendicular recording.

To read information, magnetic patterns detected by the read/write head are converted into a series of pulses that are sent to the logic circuits to be converted to binary data and processed by the rest of the system. To write information, a write element located on the read/write head generates a magnetic write field that travels vertically through the magnetic recording layer and returns to the write element through a soft underlayer.

Hard disk drive designs require adequate off-track capability (OTC) and sufficiently small adjacent track interference or erasure (ATI). Both OTC and ATI are sensitive to the track pitch on the magnetic media disk: each gets worse as the track pitch decreases. Despite those relationships, further reductions in track pitch are required for future generations of disk drives in order to increase the overall performance of drives. Unfortunately, OTC and ATI are affected by the track pitch in very different ways.

In current disk drive design, only OTC is taken into consideration when track pitch is determined for a disk drive. This can lead to high ATI failure rates. Conventional solutions to this ATI issue use encroachment tests only after the track pitch is set for the disk drive. See, e.g., U.S. Pat. No. 7,227,708, and US Pat. App. Pub. 2008/0062550. For example, a victim track may first be written and an aggressor track is subsequently written multiple times. The ATI is then obtained from the signal or error rate loss in the victim track. When failure occurs during such ATI tests, the track pitch is adjusted on a trial and error basis. This process is repeated until an acceptable overall performance for the drive is attained. Although these solutions are workable, an improved solution for determining the track pitch in hard disk drives would be desirable.

SUMMARY OF THE INVENTION

Embodiments of a system, method, and apparatus for determining the track pitch in hard disk drives to satisfy the requirements of both off-track capacity (OTC) and adjacent track interference or erasure (ATI) are disclosed. The invention separately measures two different track pitches. One track pitch is based on the OTC requirement (i.e., the OTC track pitch) and another track pitch is based on the ATI requirement (i.e., the ATI track pitch). The final track pitch for the drive is the larger of the OTC track pitch and the ATI track pitch. A properly selected track pitch is important to satisfy both the OTC and ATI requirements to ensure performance and reliability of the drive.

In some embodiments, the OTC track pitch is measured and set with a conventional 747 curve. The ATI track pitch may be obtained by measuring the positions of the adjacent tracks at which the on-track error rate is not worse than a given value after the targeted number of adjacent track writes in the ATI requirement. In some embodiments, one advantage is that the final track pitch for the drive is determined with both OTC and ATI measurements taken into consideration. In addition, measurements of both the OTC and ATI track pitches are available in the drive operations, or may be obtained by minor modifications of existing drive operations. With conventional OTC and 747 measurements, the adjacent tracks are written only once. In various embodiments, however, they are written multiple times. In addition, the track pitch at which the OTC=0 or the 747 curve crosses the x-axis is defined as the ATI track pitch.

In another example, a method embodiment comprises measuring a 747 curve and determining an OTC track pitch; measuring ATI track pitch with different numbers of adjacent track writes. A logarithmic function is fit to the ATI track pitch and numbers of adjacent track writes data. An ATI track pitch is calculated for the desired number of adjacent track writes using a fitted function. A final track pitch is then selected from the greater of the OTC and ATI track pitches (step 109).

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-8, embodiments of a system, method and apparatus for determining the track pitch in hard disk drives to satisfy the requirements of both off-track capacity (OTC) and adjacent track interference or erasure (ATI) are disclosed. The OTC requirement ensures sufficient soft error rate (SER) at off-track locations, while the ATI requirement ensures sufficient on-track SER after adjacent tracks are written multiple times. Both OTC and ATI are sensitive to the track pitch since they get worse as track pitch decreases. The mechanisms of their track pitch dependence, however, are different. OTC reflects direct partial erasure of the data track. ATI is caused by thermally-assisted switching of magnetization under a fringing field from the head. As a result, the OTC and ATI are affected differently by track pitch so they are measured separately.

Figure 7:
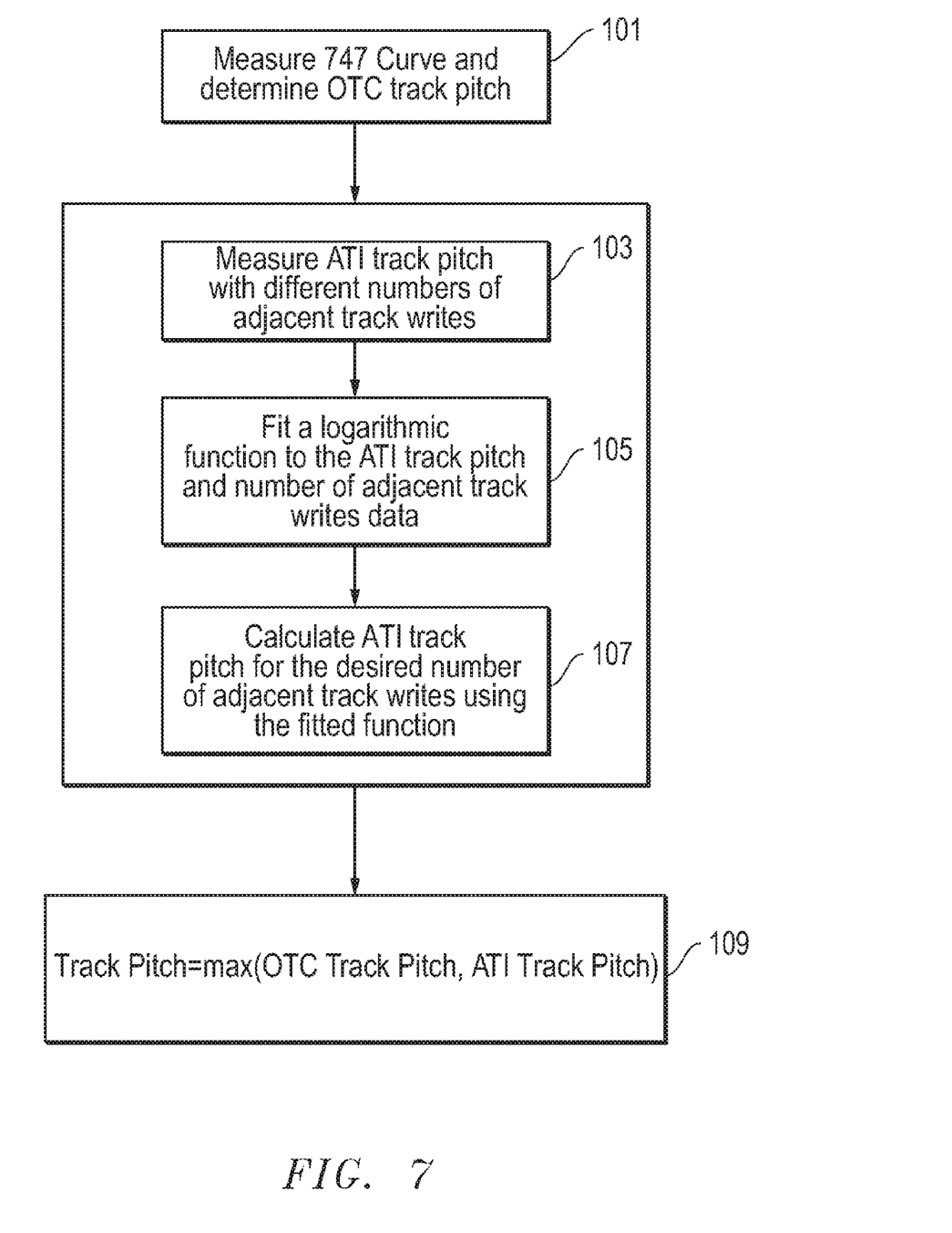
FIG. 7 is a high level flow diagram of one embodiment of a method constructed in accordance with the invention.

For example, a high level flow diagram of one embodiment of a method in accordance with the invention is depicted in FIG. 7. This embodiment of the method begins as indicated at step 101 and comprises measuring a 747 curve and determining an OTC track pitch; measuring ATI track pitch with different numbers of adjacent track writes (step 103); fitting a logarithmic function to the ATI track pitch and numbers of adjacent track writes data (step 105); calculating ATI track pitch for the desired number of adjacent track writes using a fitted function (step 107); and then selecting a final track pitch from the greater of the OTC and ATI track pitches (step 109). A more detailed description of some embodiments of the steps of the process follows.

Step 1: Measure 747 Curve and Determine Track Pitch

Figure 1:
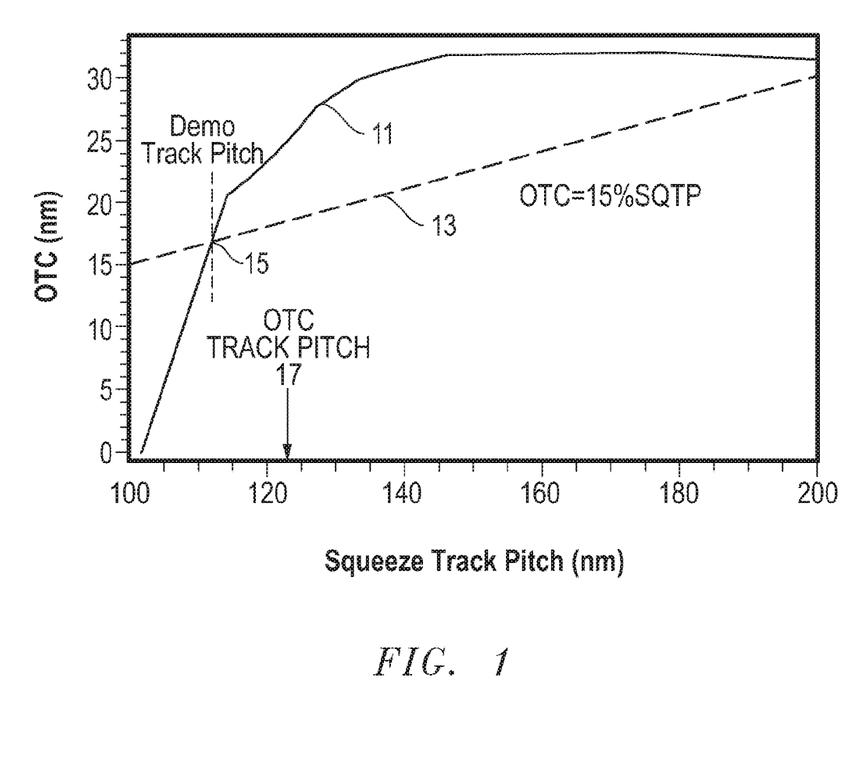
FIG. 1 is a plot of squeeze track pitch versus OTC and is constructed in accordance with the invention.

Referring now to FIG. 1, a plot of OTC with respect to a squeeze track pitch (SQTP) curve 11, or "the 747 curve," for a given SER threshold is measured. For a given SQTP, the OTC is measured from an error rate "bathtub" curve. The track pitch is then varied and OTC is measured for each track pitch. The resulting OTC versus SQTP is the 747 curve. The term "747" refers to the shape of the curve, which resembles the side view of the front portion of a Boeing 747 aircraft. The intersection of the 747 curve and a value of 15% of the squeeze track pitch (SQTP) line 13 is defined as the "demo track pitch" 15 in the illustration shown. In some embodiments, the OTC is required to be at least 15% of which ever track pitch is used. Thus, the OTC is proportional to the SQTP. The OTC track pitch 17 may be set at, for example, 110% of the demo track pitch 15 so that extra margin is included. There are similar methods to determine OTC track pitch such as, for example, the "sqzMCW" and "747MCW" methods that are sometimes used for mobile and desktop products, as are known by those of ordinary skill in the art. However, these methods are limited to determining track pitch based on only the OTC performance or reliability under encroachment.

Step 2: Measure ATI Pitch with Different Numbers of Adjacent Track Writes

The requirement for ATI is independent of that for OTC performance. ATI requires that the on-track SER be sufficient after adjacent tracks are written numerous times (e.g., 1 million writes). The ATI track pitch may be obtained by measuring the positions of the adjacent tracks at which the on-track error rate is not worse than a given value after the targeted number of adjacent track writes in the ATI requirement.

For example, some drive products require that after writing the adjacent tracks 10 k times, the error rate degradation should be less than, e.g., about 0.7 if the original error rate is $-5$. A $-5$ error rate means that there is only one error bit out of 100,000 bits. In other words, if the error rate before adjacent track writing is $-5$, after writing adjacent track 10 k times, the error rate of the data track should be $-4.3$ or lower. The error rate degradation after writing adjacent track multiple times depends on the track pitch: the wider the track pitch, the less the degradation. The ATI track pitch is the smallest track pitch that leads to error rate degradation equal to or smaller than the HDD requirement.

Figure 2:
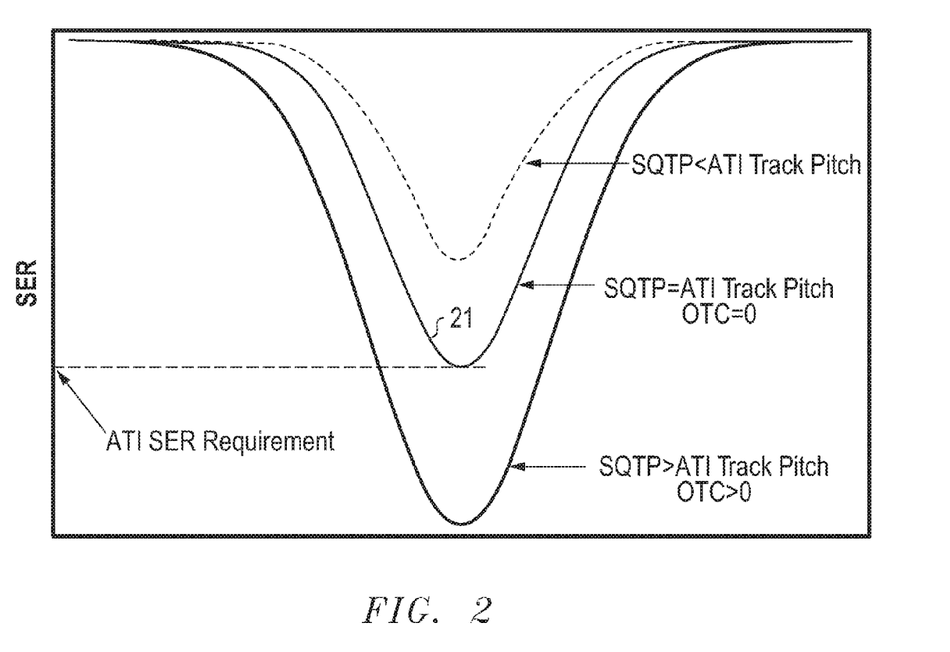
FIG. 2 is a plot of off track position versus SER and is constructed in accordance with the invention.

FIG. 2 depicts bathtub curves under various SQTPs. The on-track SER after the given number of adjacent track writes depends on the location of the adjacent tracks (e.g., the SQTP). The SQPT at which the OTC=0 at the ATI SER requirement is defined as the ATI track pitch 21.

Figure 3:
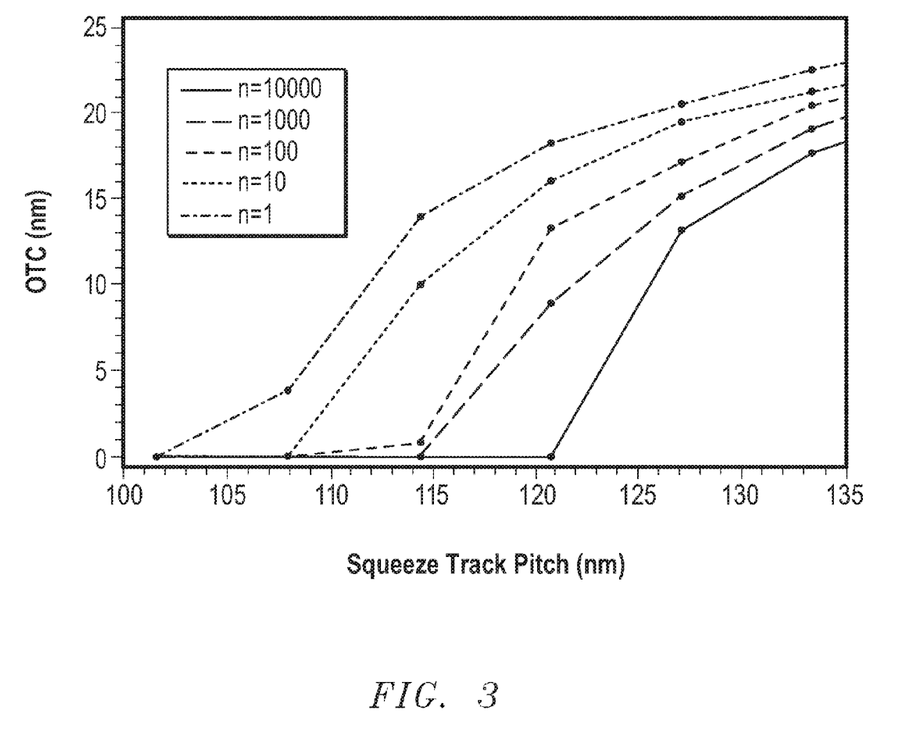
FIG. 3 is a plot of squeeze track pitch versus OTC for various numbers of writes and is constructed in accordance with the invention.

As shown in FIG. 3, the ATI track pitch may be obtained by measuring OTC versus squeeze track pitch at the ATI SER requirement level for various numbers "n" of adjacent track writes. The squeeze track pitch at which OTC=0 is defined as the ATI track pitch for the corresponding number of writes. Various 747 curves near the track pitch failure (i.e., "squeeze to death") region with various numbers of adjacent track writes 'n' are depicted. On-track BER=$-4$ after multiple adjacent track writes in the embodiment shown.

Step 3: Fit Log Function to ATI Pitch and Numbers of Adjacent Track Writes Data

Figure 4:
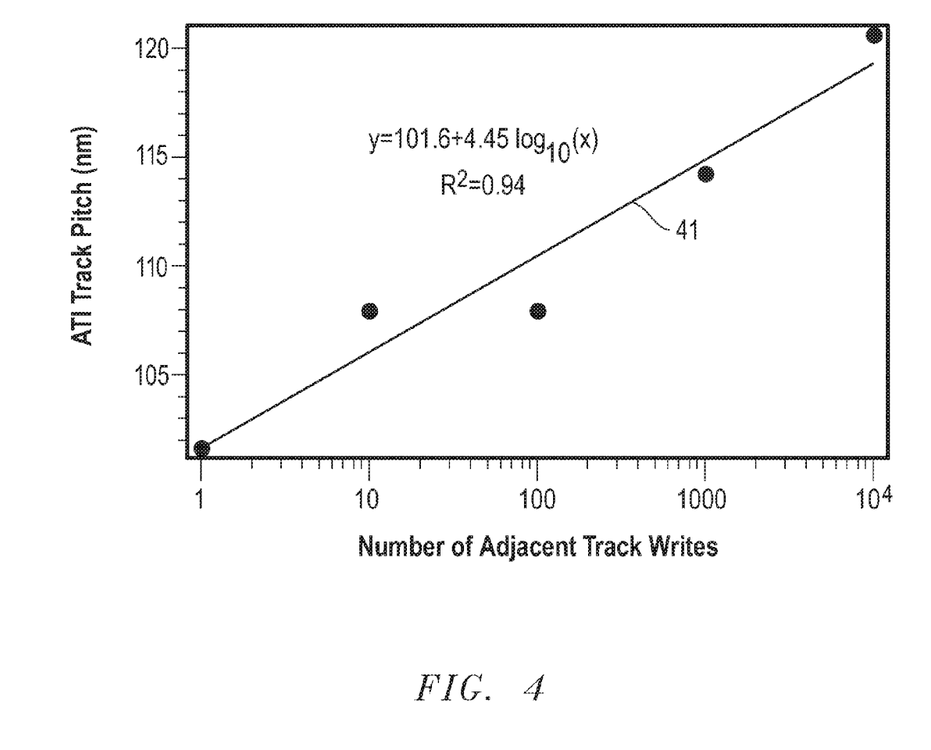
FIG. 4 is a plot of adjacent track writes versus ATI track pitch and is constructed in accordance with the invention.

Referring now to FIG. 4, the ATI track pitch 41 for various numbers of adjacent tracks obtained from Step 2 can be fitted with a logarithmic function. The logarithmic relationship is consistent with the thermal switching model of the magnetization. One example is illustrated in FIG. 4.

Figure 5:
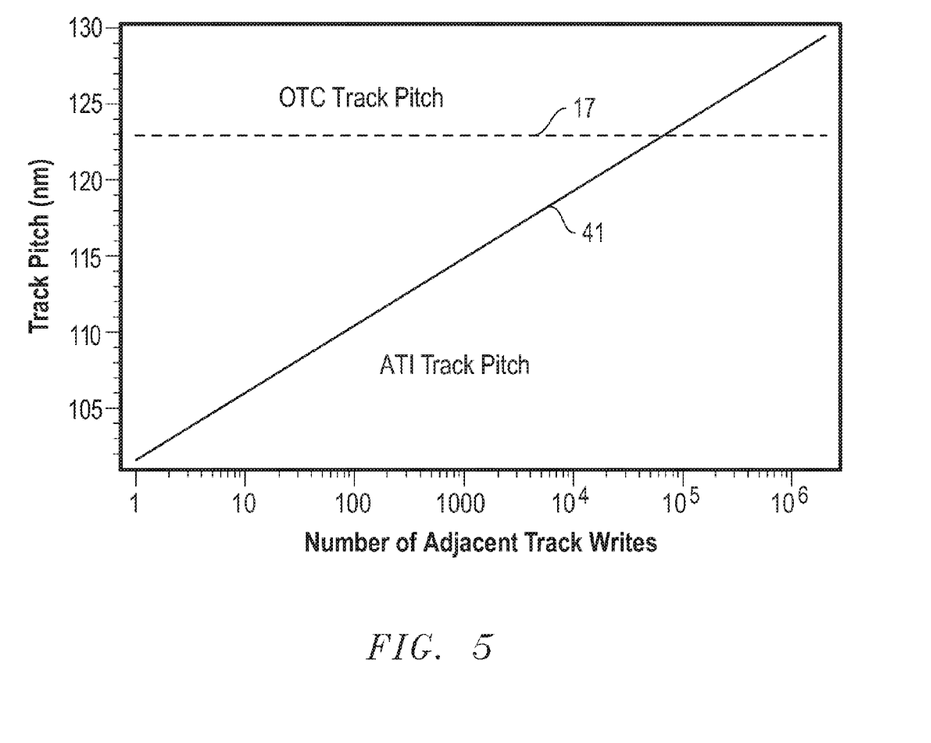
FIG. 5 is a plot of adjacent track writes versus track pitch and is constructed in accordance with the invention.

Step 4: Calculate ATI Pitch for Desired Adjacent Track Writes Using Fitted Function The fitted function obtained from Step 3 can be used to predict ATI track pitch for a large number of adjacent track writes (e.g., n=$10^6$). In FIG. 5, the ATI track pitch 41 obtained from Step 3 is plotted as a function of the number of adjacent track writes. The OTC track pitch 17, obtained in Step 1, also is plotted. When the number of adjacent track writes is greater than about 65,000, ATI track pitch 41 is larger than the OTC track pitch 17. In other words, the OTC track pitch 17 obtained in Step 1 becomes too narrow to satisfy ATI requirement.

Step 5: Select Final Track Pitch

Figure 6:
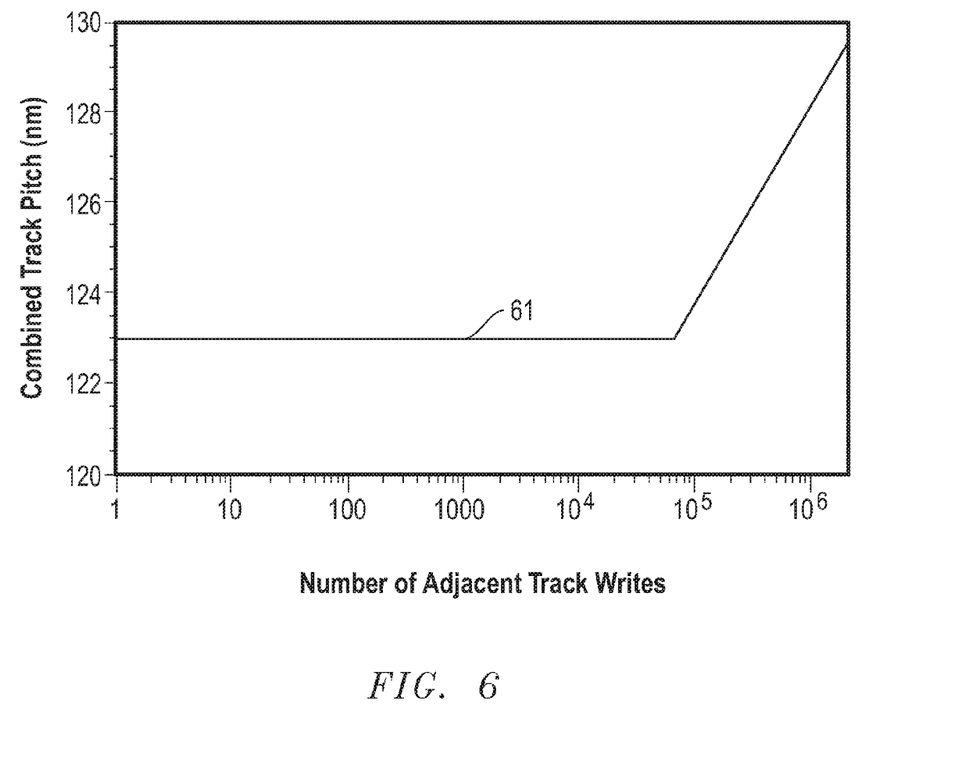
FIG. 6 is a plot of adjacent track writes versus combined track pitch and is constructed in accordance with the invention.

To satisfy both OTC and ATI requirements, the larger of the OTC track pitch and ATI track pitch should be used as the track pitch for the drive. FIG. 6 shows the drive track pitch 61 for various number of adjacent track writes in the ATI requirements. If in the ATI requirement the number of writes is less than about 65,000, the track pitch is about 123 nm, which is the same as the OTC track pitch. If the ATI requirement requires on-track BER to be −4 or greater after one million writes, the track pitch should be 128.3 nm, which is a 4.3% increase from the track pitch based on the OTC alone.

Figure 8:
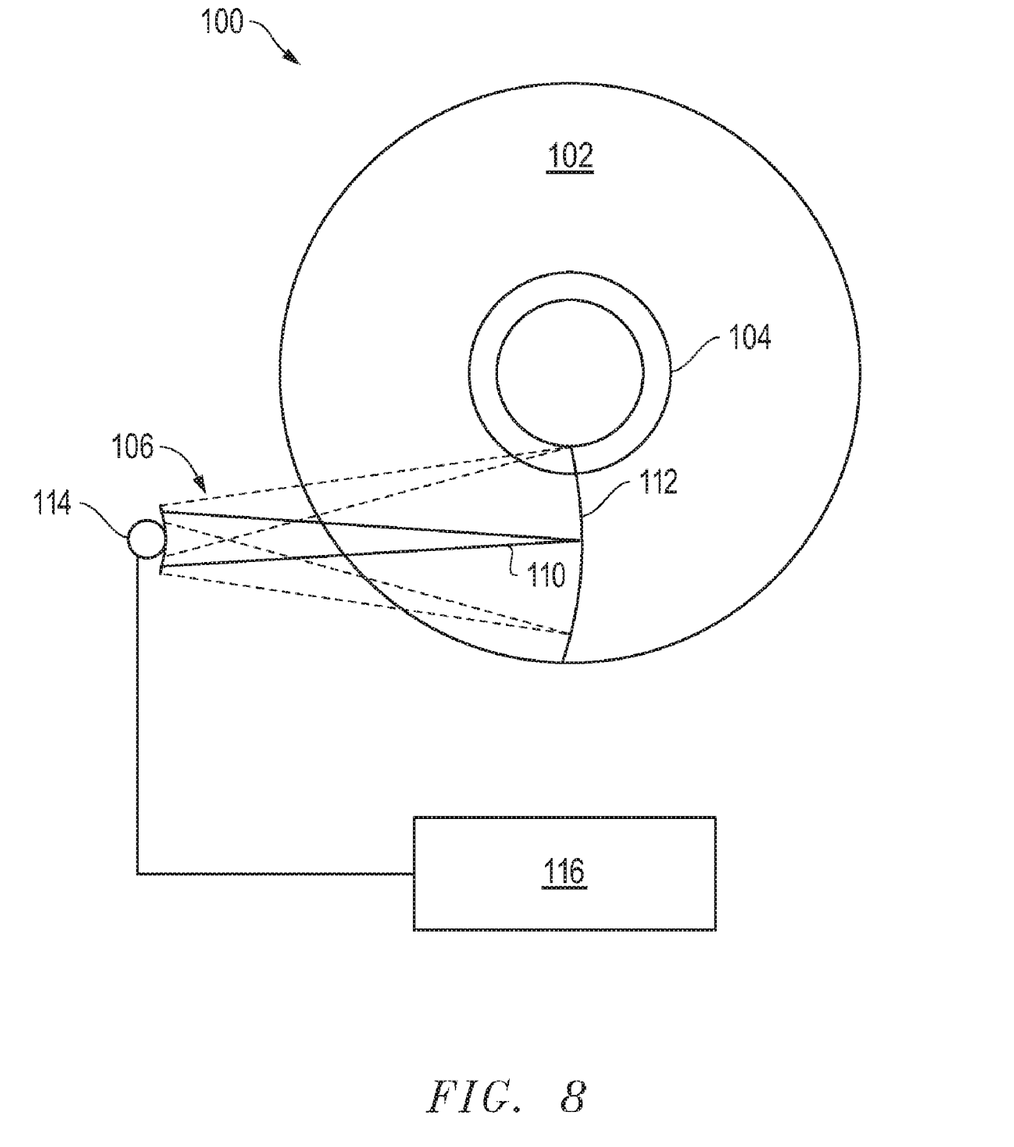
FIG. 8 is a schematic diagram of one embodiment of a disk drive constructed in accordance with the invention.

Referring to FIG. 8, a schematic diagram of a hard disk drive assembly 100 constructed in accordance with the invention is shown. A hard disk drive assembly 100 generally comprises one or more hard disks comprising a perpendicular magnetic recording media 102, rotated at high speeds by a spindle motor (not shown) during operation. The magnetic recording media 102 will be more fully described herein. Concentric data tracks 104 formed on either or both disk surfaces receive and store magnetic information.

A read/write head 110 may be moved across the disk surface by an actuator assembly 106, allowing the head 110 to read or write magnetic data to a particular track 104. The actuator assembly 106 may pivot on a pivot 114. The actuator assembly 106 may form part of a closed loop feedback system, known as servo control, which dynamically positions the read/write head 110 to compensate for thermal expansion of the perpendicular magnetic recording media 102 as well as vibrations and other disturbances. Also involved in the servo control system is a complex computational algorithm executed by a microprocessor, digital signal processor, or analog signal processor 116 that receives data address information from an associated computer, converts it to a location on the perpendicular magnetic recording media 102, and moves the read/write head 110 accordingly.

Specifically, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 104 to another. Upon referencing a servo pattern, the read/write head 110 obtains head position information that enables the control circuitry 116 to subsequently realign the head 110 to correct any detected error.

Servo patterns may be contained in engineered servo sectors 112 embedded within a plurality of data tracks 104 to allow frequent sampling of the servo patterns for optimum disk drive performance. In a typical perpendicular magnetic recording media 102, embedded servo sectors 112 extend substantially radially from the perpendicular magnetic recording media 102 center, like spokes from the center of a wheel. Unlike spokes however, servo sectors 112 form a subtle, arc-shaped path calibrated to substantially match the range of motion of the read/write head 110.

This written description uses examples to disclose the invention, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. While the invention has been shown or described in only some of its forms, it should be apparent to those skilled in the art that it is not so limited, but is susceptible to various changes without departing from the scope of the invention.

We claim:

1. A method of determining track pitch in a hard disk drive, comprising:
    (a) measuring an off-track capacity (OTC) track pitch of a magnetic media disk to ensure sufficient soft error rate (SER) at off-track locations;
    (b) measuring an adjacent track interference (ATI) track pitch of the magnetic media disk to ensure sufficient on-track SER after adjacent tracks are written multiple times;
    (c) defining a final track pitch for the hard disk drive as a larger one of the OTC track pitch and the ATI track pitch.

2. A method according to claim 1, wherein step (a) comprises measuring the OTC track pitch with a 747 curve.

3. A method according to claim 1, wherein step (b) comprises measuring positions of adjacent tracks at which an on-track error rate is not worse than a given value after a targeted number of adjacent track writes in an ATI requirement.

4. A method according to claim 3, wherein an error rate degradation is less than about 0.7 for an original error rate of about −5.

5. A method according to claim 1, wherein both the OTC and ATI track pitches are derived from operations of the hard disk drive.

6. A method of determining track pitch in a hard disk drive, comprising:
    (a) providing a hard disk drive;
    (b) measuring a 747 curve and determining an off-track capacity (OTC) track pitch of the hard disk drive;
    (c) measuring an adjacent track interference (ATI) track pitch with a plurality of adjacent track writes;
    (d) fitting a logarithmic function to the ATI track pitch and data from the number of adjacent track writes;
    (e) calculating ATI track pitch for a desired number of adjacent track writes using a fitted function; and then
    (e) selecting a final track pitch from a greater of the OTC and ATI track pitches; and
    the 747 curve is a plot of OTC versus squeeze track pitch (SQTP), and an intersection of the 747 curve and a value of 15% of a SQTP line is defined as a demo track pitch.

7. A method according to claim 6, wherein the OTC is required to be at least 15% of which ever track pitch is used, and the OTC track pitch is set at about 110% of the demo track pitch.

8. A method according to claim 6, wherein the SQPT at which OTC=0 at an ATI soft error rate (SER) requirement is the ATI track pitch.

9. A method according to claim 6, wherein step (c) comprises measuring positions of adjacent tracks at which an on-track error rate is not worse than a given value after a targeted number of adjacent track writes in an ATI requirement.

10. A method according to claim 9, wherein an error rate degradation is less than about 0.7 for an original error rate of about −5.

11. A method according to claim 6, wherein both the OTC and ATI track pitches are derived from operations of the hard disk drive.

12. A method according to claim 6, wherein step (b) ensures sufficient soft error rate (SER) at off-track locations, and step (c) ensures sufficient on-track SER after adjacent tracks are written multiple times.

13. A method of determining track pitch in a hard disk drive, comprising:
    (a) providing a hard disk drive;
    (b) measuring a 747 curve and determining an off-track capacity (OTC) track pitch of the hard disk drive;
    (c) measuring an adjacent track interference (ATI) track pitch with a plurality of adjacent track writes by measuring positions of adjacent tracks at which an on-track error rate is not worse than a given value after a targeted number of adjacent track writes in an ATI requirement;
(d) fitting a logarithmic function to the ATI track pitch and data from the number of adjacent track writes;
(e) calculating ATI track pitch for a desired number of adjacent track writes using a fitted function; and then
(e) selecting a final track pitch from a greater of the OTC and ATI track pitches; and
an error rate degradation is less than about 0.7 for an original error rate of about −5, and both the OTC and ATI track pitches are derived from operations of the hard disk drive.

14. A method according to claim 13, wherein the 747 curve is a plot of OTC versus squeeze track pitch (SQTP), an intersection of the 747 curve and a value of 15% of a SQTP line is defined as a demo track pitch, the OTC is required to be at least 15% of which ever track pitch is used, and the OTC track pitch is set at about 110% of the demo track pitch.

15. A method according to claim 14, wherein the SQPT at which OTC=0 at an ATI soft error rate (SER) requirement is the ATI track pitch.

16. A method according to claim 13, wherein step (b) ensures sufficient soft error rate (SER) at off-track locations, and step (c) ensures sufficient on-track SER after adjacent tracks are written multiple times.

* * * * *